United States Patent
Simons

[11] Patent Number: 6,010,206
[45] Date of Patent: Jan. 4, 2000

[54] METHOD AND SYSTEM FOR DETECTING THE POSITION OF A CARRIAGE

[75] Inventor: Johannes M. M. Simons, Venlo, Netherlands

[73] Assignee: Oce-Technologies B.V., Ma Venlo, Netherlands

[21] Appl. No.: 08/856,582

[22] Filed: May 15, 1997

[30] Foreign Application Priority Data

May 15, 1996 [EP] European Pat. Off. .............. 96201317

[51] Int. Cl.[7] .................................................. B41J 2/145
[52] U.S. Cl. .............................................................. 347/40
[58] Field of Search ................................ 347/37, 138, 40; 400/279, 320, 322, 703, 705, 705.1, 705.5, 283; 33/1 M, 18.1, 19.1, 19.2, 20.2; 250/237 R, 237 G

[56] References Cited

U.S. PATENT DOCUMENTS

| | | | |
|---|---|---|---|
| 4,180,703 | 12/1979 | Cialone et al. ............................. | 347/37 |
| 5,170,416 | 12/1992 | Goetz et al. ............................... | 377/17 |
| 5,184,011 | 2/1993 | Hubble, III et al. ............... | 250/231.14 |
| 5,276,970 | 1/1994 | Wilcox et al. ............................. | 347/40 |
| 5,488,397 | 1/1996 | Nguyen et al. ........................... | 347/40 |

FOREIGN PATENT DOCUMENTS

| | | |
|---|---|---|
| 634279A2 | 1/1995 | European Pat. Off. . |
| 644056A2 | 3/1995 | European Pat. Off. . |
| 3173667 | 7/1991 | Japan . |

Primary Examiner—N. Le
Assistant Examiner—L. Anderson

[57] ABSTRACT

A method and device for detecting, in a printer or scanner, the position of a carriage moving along a codestrip provided with a sequence of position marks. Sensors mounted on the carriage generate a detection signal each time that they detect an individual position mark, the timings of the detection signals are measured, and basic position information regarding the carriage is determined on the basis of these timings. Two sensors are arranged on the carriage at a predetermined distance, L, from one another in the direction of movement. The basic position information, derived from the timings of the detection signals from both sensors, is then calibrated on the basis of the distance, L, between the two sensors.

15 Claims, 2 Drawing Sheets

METHOD AND SYSTEM FOR DETECTING THE POSITION OF A CARRIAGE

FIELD OF THE INVENTION

The present invention relates to a method and system for detecting the position of a moving carriage in a printer, plotter or scanner.

BACKGROUND OF THE INVENTION

When a carriage carrying for example a printhead in case of a printing apparatus or an optical head in case of scanning apparatus is moved along a line to be printed or scanned, it is essential to detect the actual position of the carriage or the times at which the carriage reaches predetermined positions with high accuracy in order to provide synchronizing signals for the printing or scanning process. According to a conventional approach, an encoder scale, a so-called codestrip is stationarily mounted in the frame of the apparatus and extends over the whole length of the path of travel of the carriage. The codestrip is provided with regularly spaced position marks which will be termed "slits" hereinafter. A sensor mounted on the carriage is arranged to detect the individual slits and to deliver a sequence of detection signals, e.g., a pulse train reflecting the sequence of slits, so that the position of the carriage can be determined by counting the pulses of this pulse train.

If the sensor is a transmission-type or reflection-type optical sensor, the position marks on the codestrip may be formed by slits in the proper sense of the word, i.e., a sequence of transparent and opaque regions, or by bars, i.e., a sequence of bright and dark areas. In general, the encoding system is not limited to optical systems but may comprise, for example, a magnetic codestrip and a magnetic head for detecting magnetic position marks.

U.S. Pat. No. 5,170,416 discloses a method of employing a transmission-type optical sensor. This document is concerned with the correction of duty-cycle errors generated by imperfections in the codestrip and/or the sensor. Such duty-cycle errors may, for example, be caused by differences in the rise and fall times of the pulse train delivered by the sensor or by random errors in the positions of the opaque-transparent and transparent-opaque transitions of the codestrip. To correct these errors, it is proposed to measure the time elapsed between the successive opaque-transparent transitions and to generate a synthetic pulse signal the duty-cycle of which is proportional to the measured time.

If a comparatively cheap codestrip is used, there may be considerable random variations between the successive opaque-transparent transition or, more generally, between the positions of successive slits. In addition, a systematic error may be caused by expansion or shrinkage of the codestrip due to mechanical stresses or temperature variations. These kinds of errors cannot be corrected with the prior proposed system.

In order to achieve a reliable position detection, it is therefore necessary to use a high quality codestrip running the full length of the platen, which is rather expensive. In particular, the codestrip should be made of a material which has a thermal expansion coefficient close to zero. The costs for such a codestrip and the mounting structure thereof tend to increase drastically when the carriage has to travel over a large distance, as is the case for example in a large-format printing apparatus in which a single print line may have a length of more than one meter.

SUMMARY OF THE INVENTION

It is therefore an object of the invention to improve the accuracy of the position detection of a moving carriage in a printer, plotter or scanner without imposing higher quality requirements on the codestrip.

According to the invention, each slit of the codestrip is detected twice with the aid of two sensors which are mounted on the carriage at a predetermined spacing in the direction of movement. The timings of the individual detection signals are measured, and the position information is derived from these timings and is calibrated on the basis of the distance between the two sensors. The distance between the sensors is much smaller than the total length of travel of the carriage and can therefore be measured and/or stably adjusted with high accuracy. This distance is then used to detect and correct errors in the positions of the slits of the codestrip.

If, for example, the distance L between the two sensors of the invention is j times the nominal spacing d between successive slits plus a certain remainder r (j being an integer), and the trailing one of the sensors detects a specific slit i, then the distance between the slits i and i+j must be L−r. If the carriage has the velocity v, and t is the time which has lapsed since the leading sensor has detected the slit i+j, r can be calculated from the equation r=vt. The velocity v can directly be derived from the timings of the detection signals, using, for example, the nominal distance between successive slits or the known distance L.

Thus, it is possible in the invention to calculate the actual distance between the slits i and i+j from the values L, v and t. The result obtained in this way is highly reliable, because L and t are known or can be measured, respectively, with high accuracy and a possible uncertainty in the value v influences only the remainder r, i.e., a very small fraction of the total distance.

When the codestrip is free of errors, the result obtained in this way should be equal to j times the nominal slit distance d. If it is found that there exists a discrepancy between the calculated value and j*d, then the calculated value, which is more reliable, can be used to calibrate the slit distances d in the corresponding range of the codestrip, i.e., between i and i+j. Thus, a systematic error in the position detection can be corrected efficiently. The correction can be made in real time, i.e., the position of the trailing one of the two sensors can be detected with high accuracy and without substantial accumulation of errors over the total distance of travel.

In a preferred embodiment, the individual slit-to-slit spacings di are corrected on the basis of the timings of the detection signals and the velocity of the carriage. In this case, it is possible to correct not only systematic errors due to expansion or shrinkage of the codestrip but also random fluctuations in the distances between the individual slits.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
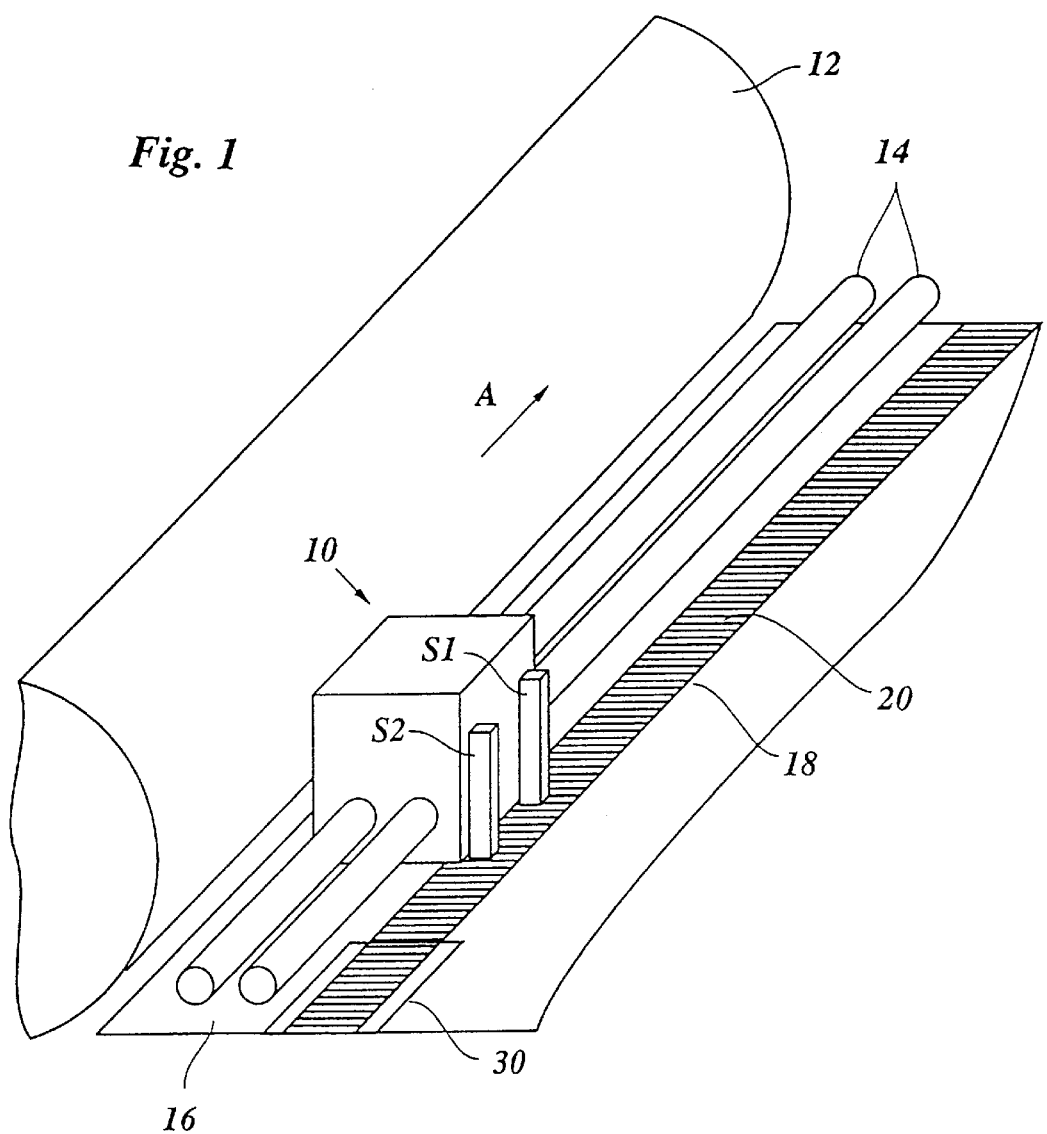
FIG. 1 is a schematic perspective view of a printhead carriage travelling along a platen of a printer, and a system according to the invention for detecting the position of the carriage.

In FIG. 1, a carriage 10 carrying, for example an ink-jet or a laser printhead or an optical assembly, is moved back and forth in main scanning direction along a platen 12 on which a printing medium is transported in a subscanning direction. The carriage 10 is guided on guide rails 14 which are mounted in a fixed position in relation to the platen 12 and a frame body 16. A codestrip 18 having a plurality of position marks or slits 20 is fixed to the frame body 16 and extends along the guide rails 14. Two optical sensors S1 and S2 are fixedly mounted on the carriage 10 with a predetermined distance therebetween in lengthwise direction of the codestrip 18. The sensitive portions of the sensors S1, S2 face the codestrip, so that the individual slits 20 can be detected.

For simplifying the discussion, it shall be assumed that the carriage 10 moves in the direction indicated by an arrow A. Of course, the system according to the invention can operate in an analogous way when the carriage moves in the opposite direction. In relation to the direction A the sensor S1 is the leading sensor and the sensor S2 is the trailing sensor.

In a first embodiment, the effective distance L between the two sensors S1 and S2 is adjusted or measured with highest possible accuracy when the sensors are mounted on the carriage. Further, the substrate on which the two sensors are mounted is made of a material which undergoes no substantial thermal expansion, so that the distance L will not be altered during the life time of the apparatus. In a practical embodiment, the distance L may be in the order of 8 mm, whereas to the total length of the platen 12 may be in the order of one meter or more. Since the distance between the two sensors is comparatively small, the hardware which guaranties the stability of the distance value L is available at comparatively low costs.

In contrast, if a similar level of accuracy would be required for the positions of the slits 20 over the whole length of the codestrip 18, considerable expenses would be necessary for the codestrip having a sufficient quality and length. According to the invention, a comparatively low-cost codestrip 18 is employed, and positional errors in the slits of the codestrip are corrected electronically, as will be explained hereinafter.

Figure 2:
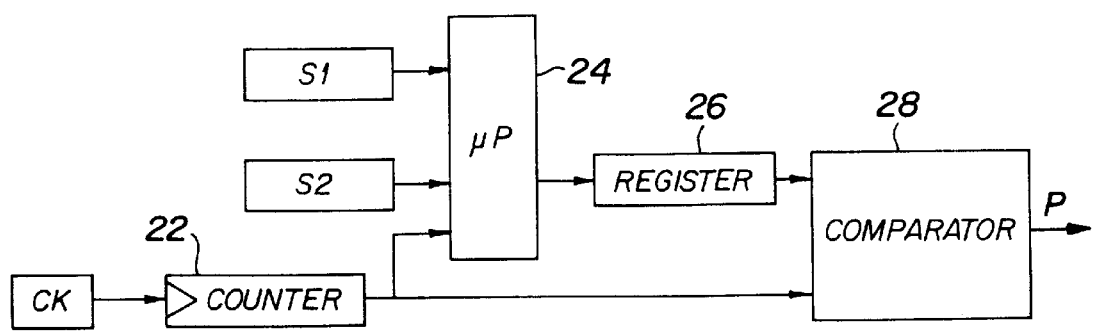
FIG. 2 is a block diagram of the position detecting system.

As is shown in FIG. 2, a system for detecting the position of the carriage 10 comprises the sensors S1 and S2, a clock CK, a counter 22, a processor 24, a register 26 and a digital comparator 28. The processor 24 may be a known microprocessor with peripheral devices such as RAM and ROM memories, I/O-ports and the like and may also be used for other purposes, for example, for performing control functions in conjunction with the operation of the printhead.

The clock CK delivers a high frequency clock signal to the counter 22. The counter 22 is reset when the carriage 10 starts to move at one lateral edge of the platen 12, or at the latest when the sensor S1 reaches the first slit (having an index i=0). The counter then starts to count the pulses of the clock signal. Whenever the sensor S1 detects a slit 20 of the codestrip, the slit being designated by an index i, the current count value of the counter 22 is read by the processor 24 and is registered as a time value $t1_i$. Likewise, when the trailing sensor S2 detects a slit i, the count value of the counter 22 is read and registered as a time value $t2_i$. On the basis of these values, the processor 24 calculates corrected position coordinates $x_i$ indicating the exact positions of the slits 20 of the codestrip 18, as will be explained in detail as the description proceeds.

The corrected position coordinates $x_i$ are memorized in the processor 24 and may then be utilized in subsequent scan cycles of the carriage 10. The position values may be updated whenever there exists a possibility that a change has occurred, for example due to thermal expansion of the frame body 16 and the codestrip. For example, the position values may be updated after a certain number of scan cycles, after a certain time of operation, in each first scan cycle after the printer has been switched off, or the like.

During the movement of the carriage, the actual scan position (which may be defined as the x-coordinate of the trailing sensor S2) can be determined in the processor 24 by counting the detection signals received from the sensor S2, i.e., by identifying the index number i of the slit, and by calculating the associated position value $x_i$ or by recalling the stored value $x_i$ from the memory.

In the shown example, the system may be configured to deliver a synchronization pulse P each time the carriage or, more exactly, the sensor S2, reaches one of a number of predetermined x-positions. To this end, the processor 24 is programmed to calculate the actual x-position of the carriage and the velocity v of the carriage on the basis of the detection signals from the sensors S1, S2 and the time values supplied from the counter 22, and to calculate a predicted time at which the sensor is going to reach the predetermined x-position. This predicted time is latched in the register 26. The contents of the register 26 are updated while the carriage approaches the predetermined x-position and the predicted time becomes more and more reliable. The comparator 28 compares the contents of the register 26 to that of the counter 22 and delivers the synchronization pulse P when the two values coincide.

It will be appreciated that, in this embodiment, the predetermined x-positions may be selected arbitrarily and are not limited to the positions of the slits 20 of the codestrip. In fact, the spacial resolution with which positions can be detected with the proposed system is not limited to the resolution of the codestrip but is mainly determined by the frequency of the clock CK and the velocity of the carriage.

It is noted that the system shown in FIG. 2 may also be configured to deliver a synthetic pulse train in which each pulse reflects a fixed minute increment of the actual position of the carriage 10. In this case, as soon as a current pulse P has been delivered, the predetermined x-position is incremented by the desired increment, and the predicted time at which the carriage will reach the new position is latched in the register 26.

While the counter 22 has been shown as a separate block in FIG. 2, the function of this counter and as well the functions of the register 26 and the comparator 28 may also be incorporated in the processor 24.

The various processings performed in the processor 24 for determining the position values $x_i$ of the slits of the codestrip and the velocity v of the carriage 10 will now be explained on conjunction with the time-displacement diagram shown in FIG. 3. In this diagram, the horizontal axis x is the displacement axis, and the vertical axis t is the time axis. The positions of the first thirteen slits of the codestrip (indicated by their index-numbers 0–12) are represented as vertical lines, and the movement of the sensors is indicated by the curves S1 and S2. It is observed that the slits are arranged at irregular spacings and the velocity of the carriage, i.e., the sensors S1 and S2, is not constant. The irregularities in the slit spacings and the velocity changes have however been exaggerated for illustration purposes. It is assumed that, initially, neither the x-coordinates of the slits nor the velocity of the carriage are known. Only the distance L between the two sensors is known exactly.

In the shown example, the carriage is accelerated from a rest position in which the leading sensor S1 coincides with the slit "0" on the codestrip. In practice, however, it is preferable that the carriage has already reached an essentially constant velocity when the sensor S1 passes the slit "0".

At the time $t1_6$, the sensor S1 has reached the slit "6". A short time later, at the time $t2_0$, the trailing sensor S2 reaches the slit "0". Thus, in the shown example, the distance L between the two sensors corresponds to approximately six slits on the codestrip (j=6). In a practical embodiment, the number j will generally be larger. If, for example, the distance L amounts to 8 mm and the codestrip has three slits per mm (d=⅓ mm), then L would correspond to approximately 24 slits (j=24).

Figure 3:
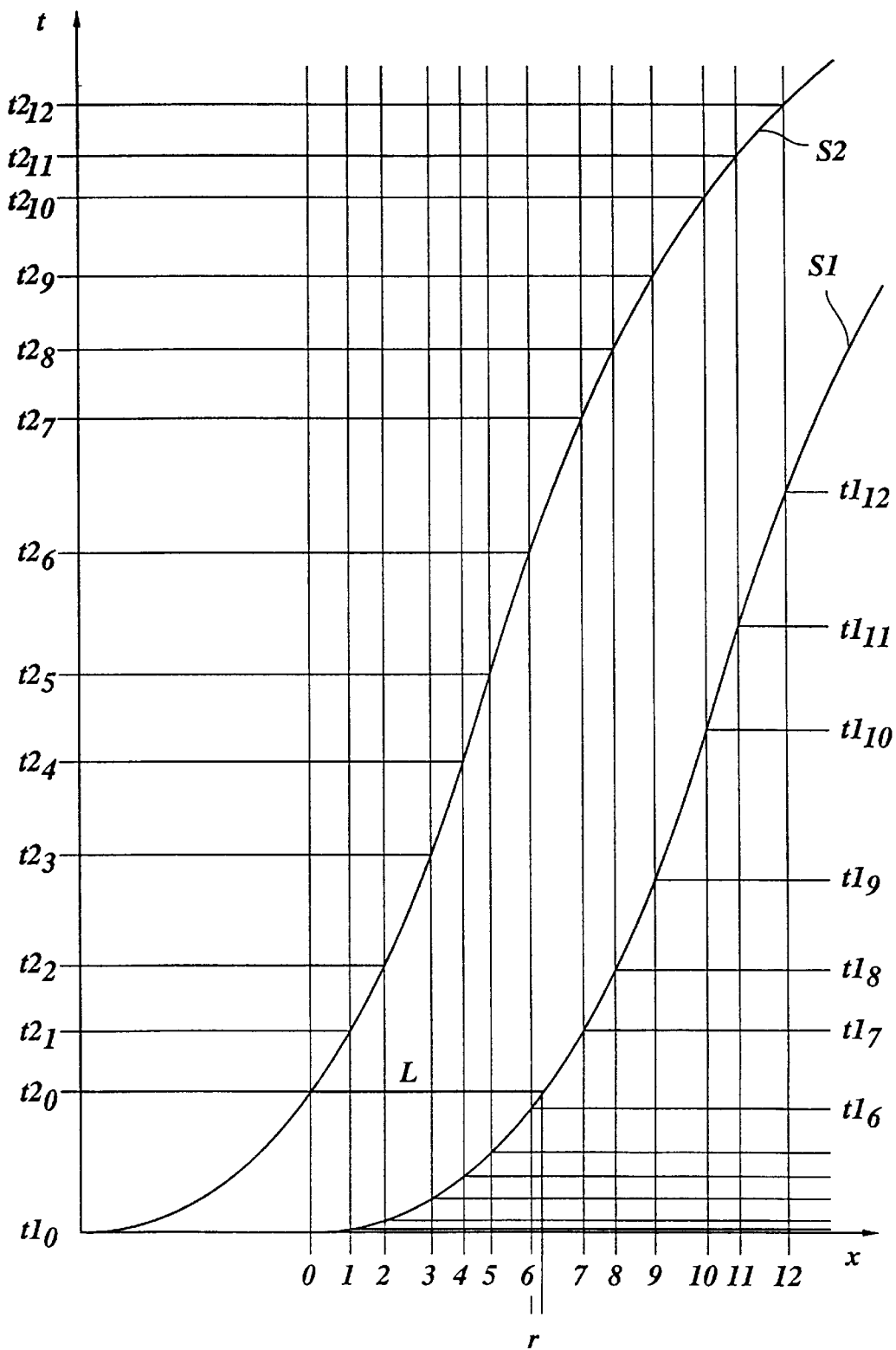
FIG. 3 is a time-displacement diagram illustrating the function principal of the invention.

In any case, the x coordinate of the slit j, i.e., the slit "6" in FIG. 3 can be determined with high accuracy, because it differs from the known distance L only by a very small amount r. If $x_6$ designates the x-coordinate of the slit "6", then:

$$x_6 = L - r = L - v \cdot (t2_0 - t1_6) \quad (1)$$

wherein v is the (average) velocity of the carriage in the time interval between $t1_6$ and $t2_0$.

There are several ways of obtaining a reasonable estimate for the velocity v. In the simplest case, the velocity of the carriage can be regarded as a known constant machine parameter. Otherwise, the velocity may be regarded as substantially constant in the time interval between $t1_0$ and $t2_0$. This time interval is determined by the instants at which both sensors S1 and S2 pass the slit "0". Thus, the average velocity during this time interval is $L/(t2_0 - t1_0)$ As another possibility, it may be considered that the distance between the slits "0" and "1" is equal to the nominal slit distance d, so that the velocity can be calculated as $v = d/(t2_1 - t2_0)$. Alternatively, the timing signals from the first sensor S1 may be used: $v = d/(t1_6 - t1_5)$ or, after the sensor S1 has reached the slit "7": $v = d/(t1_7 - t1_6)$. The accuracy may be increased by calculating an average or a weighted average of the various values for the velocity v.

An even more reliable estimate for the velocity v used in equation (1) can be obtained by assuming that the movement of the sensor S1 between "0" and "6" can approximately be described as a motion with constant acceleration, a.

$$v(t) = v_0 + at \quad (2)$$

Since, in practice, the velocity of the carriage will be almost constant and velocity fluctuations will have a rather low frequency, this assumption provides in fact a good approximation. If V1 designates the average velocity in the first half of the motion, i.e., between "0" and "3", and V2 indicates the average velocity in the second half, i.e., between "3" and "6", then it is found that:

$$V1 = v_0 + (1/4)at \quad (3)$$

$$V2 = v_0 + (3/4)at \quad (4)$$

Resolving the equations (3) and (4) for the initial velocity $v_0$ and the final velocity v yields:

$$v_0 = (3/2)V1 - (1/2)V2 \quad (5)$$

and $$v = (3/2)V2 - (1/2)V1 \quad (6)$$

Since the velocities V1 and V2 are averages over a large number (j/2) of slits, they can be detected with rather high accuracy, utilizing the detected timings $t1_0$, $t1_3$ and $t1_6$ and the nominal slit distance d. A possible systematic error which may be introduced by utilizing the nominal distance d (instead of the unknown actual distances between "0" and "3" and between "3" and "6") may be eliminated as follows. The initial velocity v0 and the final velocity v obtained from equations (5) and (6) may be used to calculate the average velocity over the whole interval from "0" to "6". If this average velocity deviates from the more reliable value $L/(t2_0 - t1_0)$, then the final velocity v obtained from equation (6) is multiplied by a scaling factor which corrects the deviation in the average velocities.

Even if the velocity v inserted in equation (1) includes a certain error, this error influences only the small value r, so that the total error in the coordinate value $x_6$ is very small, in particular when the distance L covers a large number j of slits.

In addition, the less reliable term r in equation (1) can always be made smaller than half the maximum distance between successive slits. If, in FIG. 3, L would be slightly larger, so that r would be larger than half the distance between "6" and "7", then the equation (1) would be replaced by the following equation (1'):

$$x_7 = L + r = L + v(t1_7 - t2_0) \quad (1')$$

In this case the sensor S2 reaches the slit "0" earlier than the sensor S1 reaches the slit "7".

When, in the example of FIG. 3, the movement of the carriage continues and the trailing sensor S2 reaches the slit "6" or "7" of which the x coordinate is known exactly, then the x-position of slit "12" or "13" can be determined in the same way. By iterating this procedure, the x-coordinate of every j-th slit over the whole length of a codestrip 18 can be detected with high accuracy, regardless of the quality of the codestrip. Thus, any systematic errors due to expansion or shrinkage of the codestrip can be corrected.

The error involved in each individual iteration step is given by the error in the determination of r. Since r never becomes larger than half the distance d between two successive slits, this error is not larger than Dv*d/2 wherein Dv is the error in the determination of the velocity v. This error can occur in each iteration step, that is, each time the carriage has travelled the distance L. Thus, when the carriage travels over a long distance, the accumulated error is proportional to this distance but inversely proportional to L.

In the above embodiment, it is important that the distance L is known exactly. If the carriage 10 is provided with an additional sensor which is capable of detecting the edge of the printing medium disposed on the platen 12, then the result of the position detection can be compared to the known width of the printing medium, and the comparison result can be used to re-calibrate the distance L. Then, a reliable position detection can be guaranteed even if the distance L between the sensors S1 and S2 is not stable.

Of course, the known x-coordinates of every j-th slit can be used to calibrate the x-coordinates of all the other slits. In a very rough approach, this can be done simply by assuming the distances between the pairs of subsequent slits are equal. However, since the velocity v of the carriage has been determined in one of the ways described above, a more exact correction of the x-coordinates of the slits is possible by taking the velocity of the carriage into account.

Referring to FIG. 3, if it is assumed that the acceleration of the carriage between the slits "0" and "6" is constant, then the average velocities $V_i$ in the intervals between the slits "0" and "i" (i=2 . . . 5) can be calculated, and the corresponding x-coordinates $x_i$ of the slits are given by $x_i = V_i (t1_i - t1_0)$.

In a preferred embodiment, the coordinate values xi are determined on the basis of the assumption that the velocity of the carriage in the interval between the slits i−1 and i is essentially the same as the velocity in the interval between the slits i and i+1. Then, the ratio between the length of two neighboring slit intervals should be equal to the ratio of the time intervals in which the sensor S1 or S2 travels through these slit intervals. If, for example, the signals from the sensor S2 are used, the processor 24 determines the ratios $C_i = dt_{i-1}/dt_{i-2}$, wherein $dt_{i-1}$ is the time in which the sensor S2 travels from slit i−1 to slit i and $dt_{i-2}$ is the time in which this sensor travels from the slit i−2 to the slit i−1. $C_1$ is set to 1. When the ratios Ci have been determined for all slit intervals between "1" and "j" (j=6 in FIG. 3), normalized slit spacings $D_i$ are calculated as follows:

$$D_0 = 1$$
$$D_1 = 1 \times C1$$
$$D_2 = 1 \times C1 \times C2$$
$$D_3 = 1 \times C1 \times C2 \times C3$$

and so on.

These normalized slit spacings Di indicate the spacings between the slits i−1 and i relative to the spacing between the slits "0" and "1".

In the next step, the normalized slit spacings Di are summed from i=1 to i=j, and the sum is stored in the memory of the processor 24.

Then, the absolute slit spacings di are calculated by multiplying the normalized spacings $D_i$ with the known total distance between the slits "0" and j and by dividing the product by the stored sum. The coordinate values $x_i$ are then calculated by summing the absolute slit spacings from 0 to i.

Table I gives an example which is based on the data shown in FIG. 3.

TABLE I

| i | $dt_i$ | $C_i$ | $D_i$ | $d_i$ | $x_i$ | comp | err |
|---|---|---|---|---|---|---|---|
| 0 | | | | | 0.00 | 0.00 | 0.00 |
| 1 | 10.09 | 1.00 | 1.00 | 4.20 | 4.20 | 6.71 | 2.51 |
| 2 | 10.94 | 1.08 | 1.08 | 4.56 | 8.76 | 12.59 | 3.83 |
| 3 | 18.39 | 1.68 | 1.82 | 7.66 | 16.42 | 20.57 | 4.15 |
| 4 | 15.46 | 0.84 | 1.53 | 6.44 | 22.87 | 26.02 | 3.15 |
| 5 | 14.54 | 0.94 | 1.44 | 6.06 | 28.92 | 30.64 | 1.72 |
| 6 | 20.25 | 1.39 | 2.01 | 8.44 | 37.36 | 37.36 | 0.00 |
| | | sum: | 8.89 | | | | |

The indexes i of the slits "0" to "6" are indicated in the first column. The second column indicates the lengths of the time intervals $dt_i$ between the successive time values $t2_i$. The third column indicates the ratios $C_i$ between the successive time intervals $dt_i$. The fourth column indicates the normalized slit spacings $D_i$ calculated as running products of the ratios $C_i$. The sum of these normalized slit spacings is also indicated. The fifth column gives the absolute slit spacings di calibrated by means of the known total distance from "0" to "6". The corresponding coordinate values $x_i$ of the slits are indicated in the sixth column. For comparison, the seventh column indicates the actual x-coordinate of the slits in FIG. 3, and the last column indicates the error between the calculated coordinates and the actual coordinates.

It is observed that the error is zero for the slits "0" and "6" because the coordinate values of these slits are known. For the other slits, the error reaches a maximum half way between the first and the last slit.

In the given example the errors are unrealistically high because the assumption that the velocity of the carriage does not substantially change over distance of two slits is not really fulfilled. In practice, the procedure described above yields fairly reliably values for the x-coordinates of the slits, so that random variations in the slit positions can be successfully corrected. To further increase the accuracy, it is possible to detect the time intervals $dt_i$ with both sensors and to average the results.

When the coordinate values for i=0 to i=6 have been determined, these coordinate values can be used immediately for improving the accuracy in the detection of the velocity v of the carriage which is needed for determining the exact position of the slit "12" in the next iteration step. Then, the x-coordinates of the slits from i=7 to i=11 are determined in the same manner as above.

The accuracy in the measurement of the slit positions can be further enhanced by repeating the above procedure for several scan cycles and averaging the results. This averaging procedure will for example eliminate errors which are due to noise in the detection signals of the sensors S1 and S2.

Once the x-coordinates of the slits have been detected with a satisfactory accuracy, the burden on the processor 24 is greatly relieved. The processing steps which then have to be carried out in order to provide the output signal P can be performed in real time, even if the capacity of the processor 24 is low. The more complex processings for updating the slit coordinates can be performed when the processor 24 is not busy with other tasks.

In a modified embodiment of the invention, a gauge codestrip 30 is provided at one or both ends of the codestrip 18. This gauge codestrip is of a very high quality but has only a length which is slightly larger than the distance L between the sensors. Thus, the costs for the gauge codestrip are relatively low.

In this embodiment, the distance L between the sensors S1 and S2 can be measured by way of the gauge codestrip 30. This has the advantage that the processor 24 can detect changes of the distance L which may be due to thermal expansion of the substrate on which the sensors S1 and S2 are mounted.

This embodiment also permits another way to detect the coordinate values of the slits of the less reliable codestrip 18. Referring again to FIG. 3, it can now be assumed that the slits "0" to "7" are provided on the gauge codestrip 30, so that their x-coordinates are known exactly. The timing signals provided by the trailing sensor S2 can be used to determine the velocity of the carriage with high accuracy. Thus, when the trailing sensor S2 passes the slits "1" and "2", the average velocity of the carriage during this interval can be measured exactly. Essentially at the same time, the leading sensor S1 passes the slits "7" and "8" with the same average velocity. Thus, the distance between the slits "7" and "8" can be measured exactly.

The subsequent slit spacings between the slits "8", "9", . . . "12" can be measured in the same way. Later, when the trailing sensor S2 passes these slits, the known slit spacings can again be used for measuring the velocity of the carriage. In turn, having measured the velocity permits detection of the spacing between the next slits on the inaccurate codestrip 18. Thus, the x-coordinates of all slits 20 of a codestrip 18 can be measured. It would even be possible to use a "codestrip" on which the slits 20 are distributed irregularly.

The error involved in the calculation of the x-coordinates $x_8$ to $x_{12}$ or, more generally, from $x_{j+1}$ to $x_{2j}$, is small, because these calculations are based directly on the positions of the first j slits on the gauge codestrip 30. However, in the calculation of the coordinates of each subsequent set of j slits, the error increases exponentially. The same applies to the errors in the velocities of the carriage in the various sections of the codestrip.

It is possible, however, to correct these errors, because the distance L has been measured exactly in the initial phase of the scan movement.

For example, the distance between two slits i and i+j can be determined in two different ways. A first way is to form the difference between the coordinate values which have been derived in the manner described above. The second way is to determine the distance by way of the known distance L, using the same procedure as in the first embodiment. The result obtained in this second way will be more reliable and can be used to calibrate or scale the coordinate values of all slits between i and i+j.

Similarly, the condition for the average velocity V:

$$V = L/(t2_i - t1_i)$$

can be used to check and calibrate the detected velocities.

It will be observed that the accuracy of the position detection is better in positions which are not too far away from the gauge codestrip 30. Consequently, the accuracy over the whole length of the codestrip 18 can be improved by providing gauge codestrips 30 at both ends and averaging the results obtained during the back and forth movements of the carriage.

While only specific embodiments of the invention have been described above, it will occur to a person skilled in the art that various changes and modifications can be made without departing from the scope of the appended claims. It will also be understood that the invention is not limited to printers and scanners but may also be applied to the detection of the position of a moving object in other applications.

I claim:

1. In an imaging device such as a printer, plotter or scanner, the imaging device having a carriage moving along a low precision codestrip provided with a sequence of position marks, a method for detecting the position of said carriage comprising the steps of:

providing said carriage with a first sensor and a second sensor for sensing position marks on said low precision codestrip;

setting said sensors to be a predetermined distance L apart from each other in the direction of movement of said carriage;

causing said sensors to generate a detection signal upon each instance that said sensors detect a position mark, respectively;

measuring the timings of the detection signals;

deriving position information of said carriage as a function of said timings of said detection signals from both sensors; and calibrating said position information on the basis of said predetermined distance L between the two sensors.

2. The method according to claim 1, wherein:

said step of measuring the timings includes (a) registering a first timing at which said first sensor detects a first position mark, and (b) registering a second timing, immediately subsequent to the first timing, at which said second sensor detects a second position mark;

said step of deriving includes (c) calculating an amount r by which said first sensor is displaced between the first and second timings, on the basis of the difference between said first and second timings and on the basis of the velocity of the carriage; and said step of calibrating said positional information includes (d) calibrating the distance between the first and second position marks according to the difference L−r when the first position mark is ahead of the second position mark in the direction of movement of the carriage, and according to the sum L+r when the first position mark is positioned rearward of the second position mark in the direction of movement of the carriage.

3. The method according to claim 2, further comprising iterating said steps (a) to (d) for successive pairs of position marks.

4. The method according to claim 1, further comprising:

determining positions of intervening position marks between said first and second position marks on the basis of the calibrated distance between said first and second position marks, on the basis of said timings of said detection signals from at least one of said first and second sensors, and on the basis of the velocity of said respective sensor during travel of the respective sensor between said first and second position marks.

5. The method according to claim 4, wherein said step of determining positions of said intervening position marks includes:

determining time intervals between successive detection signals from one of said first and second sensors;

calculating ratios between said successive time intervals;

calculating, for each intervening position mark, the running product of the ratios up to a current position mark;

calculating the sum of said running products; and calculating the positions of each said intervening position mark by multiplying the associated running product with said distance between said first and second position marks and dividing the result by said sum of said running products.

6. The method according to claim 1, further comprising:

counting, for each of said position marks, transitions of a clock signal to produce a counter value;

determining the actual position and velocity of said carriage based upon said detection signals of said first and second sensors;

calculating a predicted time at which said carriage will reach a predetermined position on the basis of the actual position and velocity of the carriage;

updating said predicted time as the carriage approaches said predetermined position; and comparing said predicted time with a corresponding counter value;

delivering a synchronization pulse, indicating that said carriage has reached said predetermined position, when said count value equals said predicted time.

7. The method according to claim 1, further comprising:

determining said distance between said first and second sensors by detecting position marks on a gauge codestrip provided at least at one end of said codestrip.

8. A system in an imaging device such as printer, plotter or scanner, for detecting the position of a carriage moving along a low precision codestrip provided with a sequence of position marks, comprising:

a first sensor an d a second sensor-mounted on the carriage, for producing detection signals indicating detection of position marks on said low precision codestrip, said sensors being arranged with a predetermined distance therebetween in the direction of movement of said carriage; and a processor for registering the timings of said detection signals from both sensors, for deriving position information of said carriage as a function of said detection signals, and for calibrating said positions of the position marks based upon said known distance L between the two sensors.

9. The system according to claim 8, wherein the processor also is for memorizing the calibrated positions of said position marks for subsequent movement cycles of said carriage.

10. The system according to claim 8, wherein:

said processor is operable to:

register a first timing at which said first sensor detects a first position mark;

register a second timing, immediately subsequent to the first timing, at which said second sensor detects a second position mark;

calculate an amount r by which said first sensor is displaced between the first and second timings, on the basis of the difference between said first and second timings and on the basis of the velocity of the carriage; and calibrate the distance between the first and second position marks according to the difference L−r when the first position mark is ahead of the second position mark in the direction of movement of the carriage, and according to the sum L+r when the first position mark is positioned rearward of the second position mark in the direction of movement of the carriage.

11. The system according to claim 10, wherein said processor is operable to perform said functions of registering a first timing, registering a second timing, calculating and calibrating iteratively upon successive pairs of position marks.

12. The system according to claim 8, wherein said processor is operable to determine positions of intervening position marks between said first and second position marks on the basis of the calibrated distance between said first and second position marks, on the basis of said timings of said detection signals from at least one of said first and second sensors, and on the basis of the velocity of said respective sensor during travel of the respective sensor between said first and second position marks.

13. The system according to claim 12, wherein said processor is operable to:

determine time intervals between successive detection signals from one of said first and second sensors;

calculate ratios between said successive time intervals;

calculate for each intervening position mark, the running product of the ratios up to a current position mark;

calculate the sum of said running products; and calculate the positions of each said intervening position mark by multiplying the associated running product with said distance between said first and second position marks and dividing the result by said sum of said running products.

14. The system to claim 8, further comprising:

a counter for counting, for each of said position marks, transitions of a clock signal to produce a counter value;

wherein said processor is operable to:

determine the actual position and velocity of said carriage based upon said detection signals of said first and second sensors;

calculate a predicted time at which said carriage will reach a predetermined position on the basis of the actual position and velocity of the carriage;

update said predicted time as the carriage approaches said predetermined position;

compare said predicted time with a corresponding counter value; and deliver a synchronization pulse, indicating that said carriage has reached said predetermined position, when said count value equals said predicted time.

15. The system according to claim 8, wherein said processor is operable to determine said distance between said first and second sensors by detecting position marks on a gauge codestrip provided at least at one end of said codestrip.

* * * * *